P. HILDRETH.
Broadcast-Seeder.
No. 21,257. Patented Aug. 24, 1858.
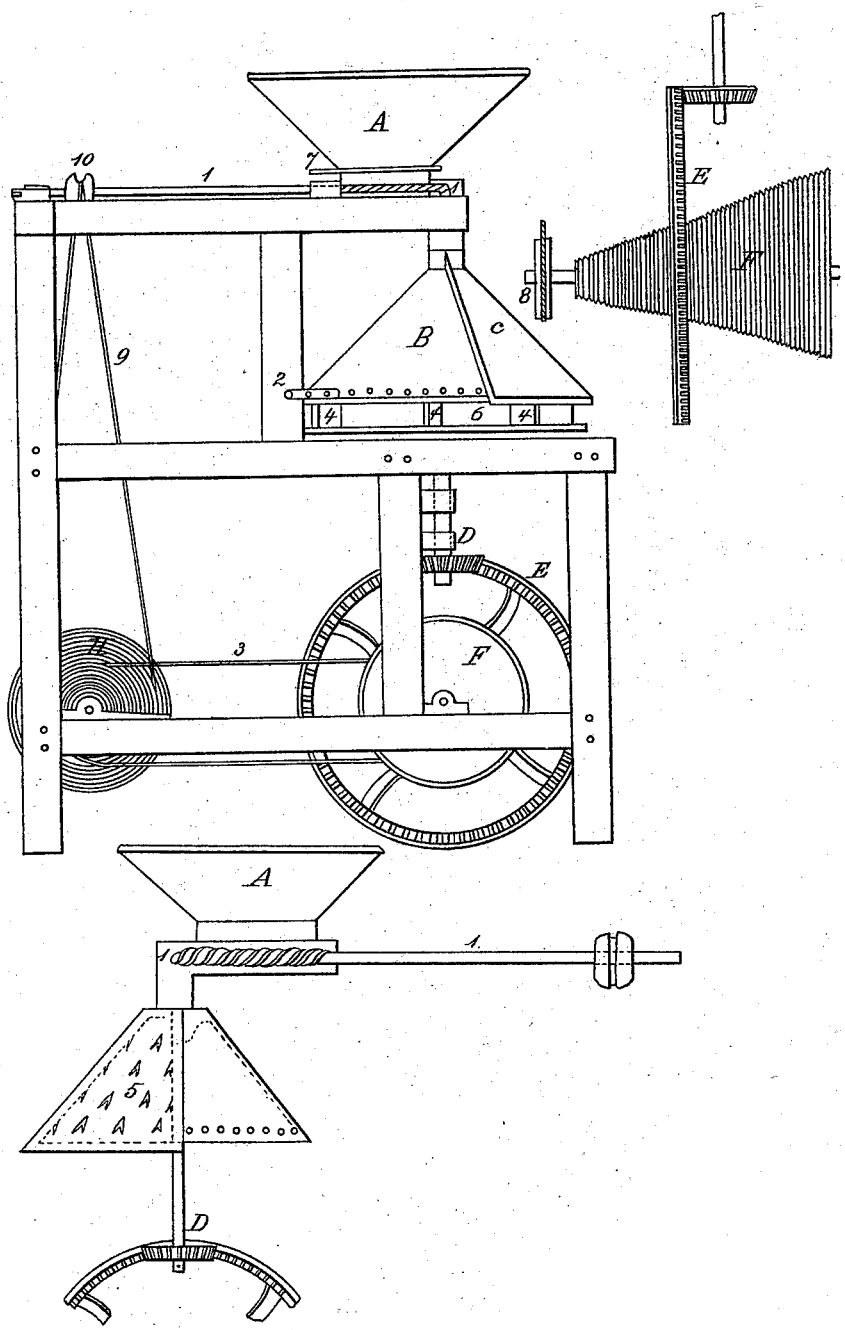

UNITED STATES PATENT OFFICE.

PAUL HILDRETH, OF BELOIT, WISCONSIN.

IMPROVEMENT IN SEEDING-MACHINES.

Specification forming part of Letters Patent No. 21,257, dated August 24, 1858.

*To all whom it may concern:*

Be it known that I, PAUL HILDRETH, of Beloit, in the county of Rock and State of Wisconsin, have invented a new and useful Machine for sowing seed broadcast, called a "Broadcast Seed-Sower," which may be used in sowing all kinds of seed or grain required to be scattered or thrown broadcast over the earth; and I do hereby declare that the following is a full, clear, and exact description of the construction and operation of the same, reference being had to the annexed drawing, making part of this specification, in which—

A is the hopper; B, the half-circular cap; C, the distributing adjustable feeder; D, the connecting-shaft and cog-wheel; E, the driving-wheel; F, a cone or graduated pulley; H, a second cone or graduated pulley. 1 is the feed-auger; 2, the adjustable lock or spring; 4 4 and 4, the buckets of the revolving distributing-cylinder; 5, the inside sectional view of the distributing adjustable feeder; 6, the revolving distributing-cylinder; 7, the hopper-slide; 8, the motive power, shaft and wheel; 3, a connecting-belt; 9, a second connecting-belt; 10, the seed-auger pulley.

I construct a broadcast seed-sower by making a revolving distributing-cylinder twenty inches in diameter, (more or less,) as seen at 6, on the outer edges or face of which I place floats or buckets, two (2) inches from the edge, (more or less,) sixteen (16) in number, (more or less,) as seen at 4, 4, and 4.

I make a distributing adjustable feeder, as seen at C, in the form of two half-tunnels, put together at such distance apart as to allow the seed to pass down into the buckets of the revolving distributing-cylinder in a full half-circle, which distributing adjustable feeder is attached to a half-circular cap, B, and is turned and regulated by an adjustable lock or spring, so as to discharge the seed upon the revolving distributing-cylinder at any given point to suit the case and the state of the wind, as seen at 2. On the upper side of the inner tunnel of the distributing adjustable feeder I place knobs or dividers, as seen at 5, for the purpose of assisting the seed to be more evenly discharged into the buckets in the full half-circle of the revolving distributing-cylinder.

I use cone or graduated pulleys, one of which is attached to and revolves with the driving-wheel E, as seen at F, and the other cone or graduated pulley, as seen at H, is attached to the first pulley, F, by belt, as seen at 3, and to the shaft of the feed-auger by belt and pully, as seen at 9 and 10, and so arranged as to turn the fed-auger 1 at any required velocity, so as to discharge any quantity required of seed from the hoppers into the distributing adjustable feeder C.

The hopper A is provided with a slide to shut off the seed from the feed-auger when desired, as seen at 2.

My broadcast seed-sower is operated and driven by means of the driving-wheel E, which is attached to the motive power by shaft and wheel, as seen at 8, and connects with the revolving distributing-cylinder by shaft and cog-wheel, as seen at D, and connecting also with shaft of feed-auger 1 by pulleys and belts, as seen at F, 3, H, 9, and 10.

I claim as my invention—

The arrangement of the cone or graduated pulleys F and H and the feed-auger 1, in connection with the revolving distributing-cylinder 6 and the distributing adjustable feeder C.

PAUL HILDRETH.

Witnesses:
JOHN BANNISTER,
ISAAC GARDNER.